United States Patent [19]

Perri

[11] Patent Number: 4,474,415
[45] Date of Patent: Oct. 2, 1984

[54] HOSE DISPENSING AND STORAGE UNIT

[76] Inventor: Vincent Perri, 3315 Royal Ave., Niagara Falls, N.Y. 14303

[21] Appl. No.: 463,524

[22] Filed: Mar. 14, 1983

[51] Int. Cl.³ ............................................. A62C 23/04
[52] U.S. Cl. .................................... 312/242; 248/75; 312/245; 312/138 A
[58] Field of Search ................... 248/75; 242/86, 86.1; 239/195, 208; 137/355.26, 355.28, 360, 377, 382; 312/242, 245, 138 A

[56] References Cited

U.S. PATENT DOCUMENTS 1,948,738  2/1934  Thayer ............................... 312/245
2,438,306  3/1948  Souther ............................. 242/86.1
2,872,246  2/1959  Zierden ............................... 242/86

*Primary Examiner*—William E. Lyddane
*Assistant Examiner*—Joseph Falk
*Attorney, Agent, or Firm*—Donald C. Studley

[57] ABSTRACT

The present invention comprises a vertical planar panel having a water source such as a tap, positioned thereon. The panel has a hose receiving receptacle positioned in the panel below the water source. The hose receiving receptacle is in the form of a conduit adapted to receive and pass a hose attached to the water source through the panel to a space behind the panel. The panel has a hose dispensing receptacle adapted to receive a hose from the space behind the panel and pass the hose through the front of the panel. Hose dispensing receptacle has an enlarged receiving portion to receive the hose from behind the panel. The enlarged receiving portion is positioned at a downward angle of between about 30° and about 45°.

4 Claims, 3 Drawing Figures

HOSE DISPENSING AND STORAGE UNIT

BACKGROUND OF THE INVENTION

The present invention relates to a hose dispensing and storage means, and is particularly adapted to the storage of water hoses, such as garden hoses, within the confines of a building, or vehicle, for example, a trailer of recreation vehicle.

Various proposals have been made for the dispensing and storage of hoses. For example, U.S. Pat. Nos. 1,599,581; 2,135,736; 2,184,363; 2,268,871; 3,072,384; 4,062,493 and 4,330,005 describe such units. However, each has its shortcomings. Many involve winches, guides, reels or rollers. None has become accepted, or widely used.

The present unit provides a simple, effective means of dispensing and storing a hose, without the complications of the prior art.

BRIEF DESCRIPTION OF THE INVENTION

The present invention comprises a vertical planar panel having a water source, such as a tap, positioned thereon. The panel has a hose receiving receptacle positioned in the panel below the water source. The hose receiving receptacle is in the form of a conduit adapted to receive and pass a hose attached to the water source through the panel to a space behind the panel. The panel has a hose dispensing receptacle adapted to receive a hose from the space behind the panel and pass the hose through the front of the panel. Hose dispensing receptacle has an enlarged receiving portion to receive the hose from behind the panel. The enlarged receiving portion is positioned at a downward angle of between about 30° and about 45°.

The present hose dispensing and storage unit is adapted to store water hoses in the basement, crawl space or space under porches and may easily be adapted to store water hoses in trailers or recreational vehicles. The present unit is also useful as a fire extinguisher when mounted within a building.

DETAILED DESCRIPTION OF THE INVENTION

The present invention will now be described in detail by reference to the accompanying drawings, in which.

Similar components are designated by similar numbers in each of the several views.

Figure 1:
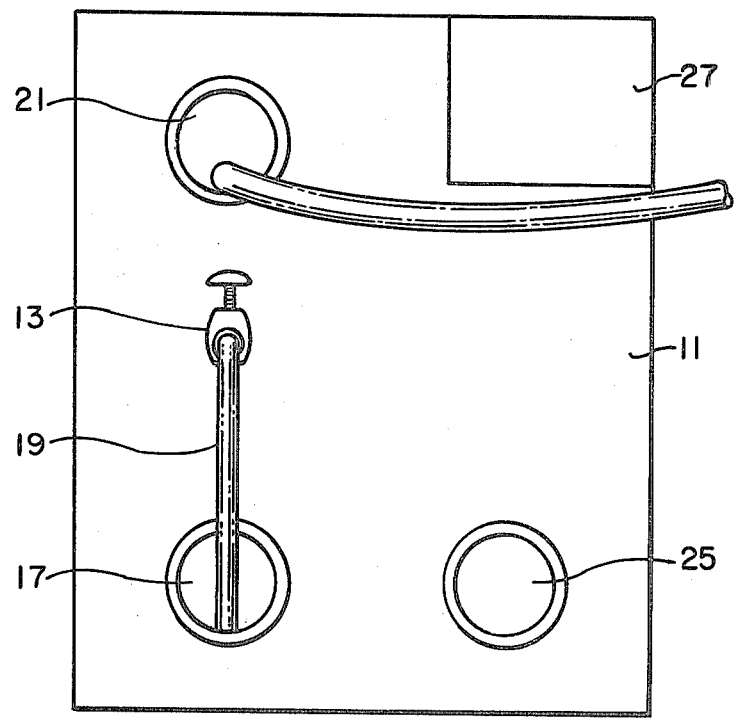
FIG. 1 is a front elevational view of the hose dispensing and storage unit as it might be attached to a building or a vehicle.
Figure 2:
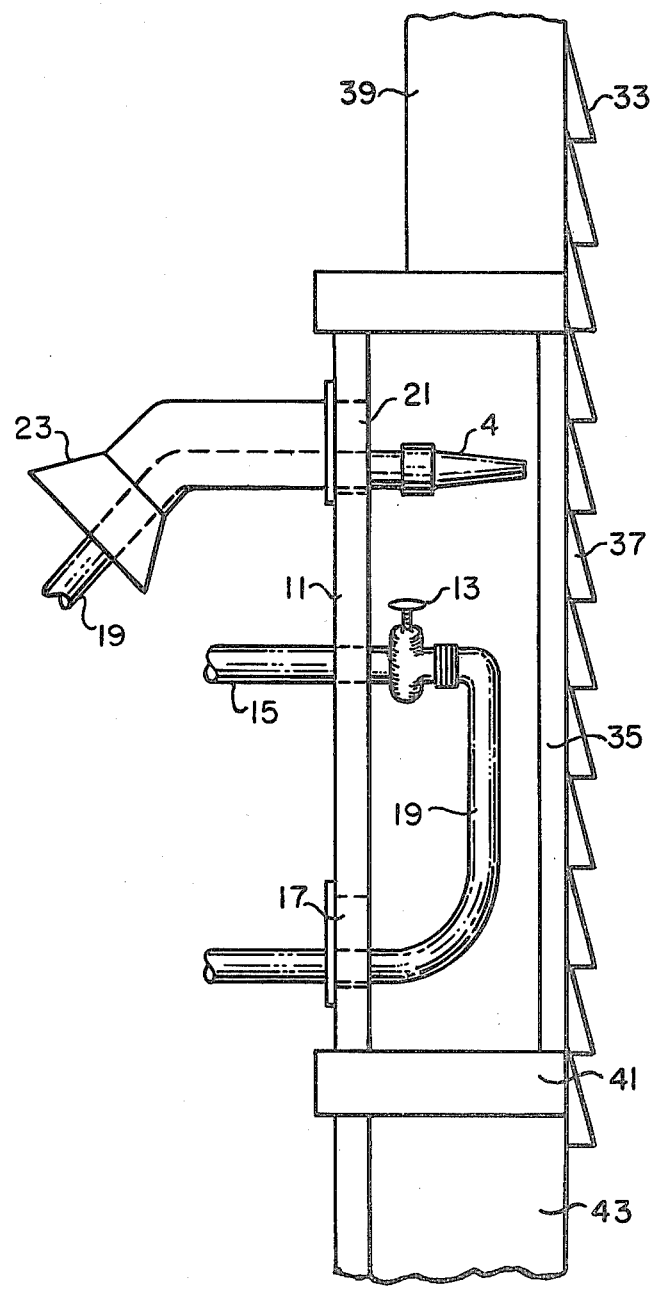
FIG. 2 is a side elevation, partly in cross-section of the unit shown in FIG. 1 as it may be typically mounted in the wall of a building.

Looking now at FIGS. 1 and 2 in detail, the hose dispensing and storage unit comprises a vertical, planar panel 11 having a water source, tap 13, thereon. The water source enters from the back portion of panel 11, suitably by means of a supply hose 15, as shown in FIG. 2. Panel 11 has a hose receiving receptacle 17, positioned in the lower portion of panel 11 below tap 13, which is a conduit adapted to receive a hose, for example, 19, attached to tap 13, and pass the hose through panel 11 to storage area behind panel 11. Panel 11 also has a hose dispensing receptacle 21 in the form of a conduit adapted to pass hose 19 from storage behind panel 11 to a position in front of the panel. Hose dispensing receptacle 21 has an enlarged intake portion, or bell portion, 23, positioned at a downward angle of between about 30° and about 45°. Receptacle 17 and the portion of receptacle 21 passing through panel 11 are preferably conduits having inside diameters of from about 1.25 to about 3.0 times the outside diameter of the hose to be passed through. The end of enlarged receiving portion 23 has an inside diameter between about 2 and about 5 times the outside diameter of the hose to be passed through.

FIG. 2 illustrates a typical installation of the unit in a building. In this figure, the building surface 33, is shown as shingles, or siding. The unit has an external door, such as 35, typically having an outside finish 37 to match the building surface, for example, shingles or siding. The door is suitably hinged and mounted to close flush and match with the outside surface of the building 33. As shown in FIG. 2, the unit may be mounted between building studs, such as 39, and atop stringer 41 on foundation 43. FIG. 2 illustrates that hose 19 is in storage in the storage area, and nozzle 4 is within the confines of the building. The arrangement shown in FIG. 2 may be adapted for use of the unit in vehicles, such as recreational vehicles or trailers. In a further adaptation, the unit in FIG. 2 may be utilized as a fire extinguisher by adapting the unit to the inside wall of a building.

In a preferred embodiment as shown in the figures, the hose dispensing receptacle 21 is positioned above, generally at least one foot, the hose receiving receptacle 17. In some installations, wherein there is storage space behind and below panel 11, a hose dispensing receptacle may be positioned in the lower portion of panel 11. Thus, for storage areas behind panel 11 that do not drop off, for example, under a porch or in a trailer or recreation vehicle, the embodiment shown in the figures may be used. When the storage space behind panel 11 has a drop, for example, in basements or crawl spaces, the hose dispensing receptacle 21 may suitably be positioned in the bottom portion of panel 11. For example, opening 25 may be adapted as the hose dispensing receptacle by equipping it with an enlarged receiving portion 23 as shown on receptacle 21.

The unit may suitably have area 27 which facilitates an electrical outlet within the panel hose dispensing and storage unit.

Figure 3:
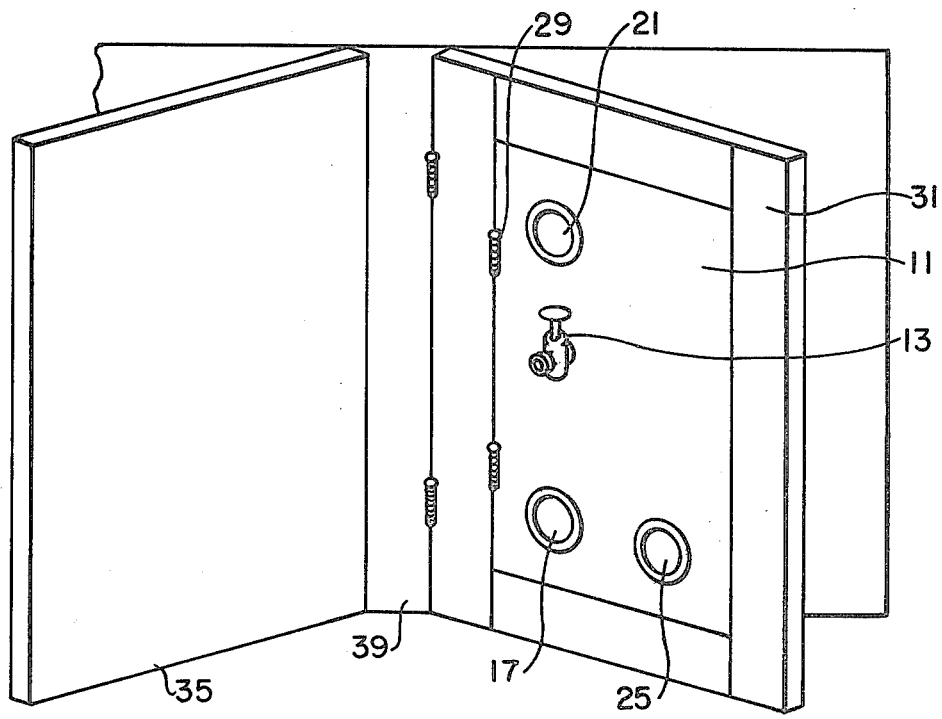
FIG. 3 is a prospective view showing a typical installation of the device having an access to the storage area behind the dispensing and storage unit.

FIG. 3 shows a further embodiment without a hose wherein outside door 35 is hingeably attached to a vertical portion of the building or vehicle, for example, 39, and panel 11 is hingeably mounted within frame member 31. Frame 31 is, in turn, hingeably attached to vertical member 39. This arrangement facilitates the use of the unit as illustrated in FIG. 2 and further, by opening frame member 31 greater access to the storage area, thus allowing a person to crawl into the space behind the unit.

The foregoing description and embodiments are intended to illustrate the invention without limiting it thereby. It will be understood that various modifications can be made in the invention without departing from the spirit or scope thereof.

What is claimed is:

1. A hose storage unit comprised of:
   a. a vertical, planar panel having a front portion and a back portion, b. a water source entering said back portion and extending through said front portion, c. a hose receiving receptacle positioned below said water source on said panel, said receptacle adapted to receive a hose connected to said water source and adapted to allow said hose to pass through said panel, from the front to the back portion into a storage area behind said panel, d. a hose dispensing receptacle positioned in said panel, said dispensing receptacle adapted to allow said hose to pass from said storage area through the back portion of said panel to the front portion thereof, and e. said hose dispensing receptacle having an enlarged portion to receive a hose from said storage area, said enlarged portion positioned at an angle of about 45° relative to said planar panel.

2. The unit of claim 1 wherein the hose dispensing receptacle is positioned above said hose receiving receptacle.

3. The unit of claim 1 wherein the portions of said receptacles passing through said panel have inside diameters between about 1.25 and 3.0 times the diameter of the hose adapted to be passed therethrough.

4. The unit of claim 1 wherein the enlarged receiving portion of said hose dispensing receptacle has an inside diameter between about 2 and about 5 times the outside diameter of the hose adapted to be passed therethrough.

* * * * *